United States Patent
Sangha et al.

(10) Patent No.: US 9,827,848 B1
(45) Date of Patent: Nov. 28, 2017

(54) ACTIVE AERODYNAMIC DAM AND METHODS OF USE THEREOF

(71) Applicant: Valeo North America, Inc., Troy, MI (US)

(72) Inventors: Tushardeep Singh Sangha, Auburn Hills, MI (US); Clarence Jackson, Auburn Hills, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/492,691

(22) Filed: Apr. 20, 2017

(51) Int. Cl.
  *B60K 11/00* (2006.01)
  *B60K 11/08* (2006.01)
  *B62D 35/00* (2006.01)

(52) U.S. Cl.
  CPC .......... *B60K 11/085* (2013.01); *B62D 35/005* (2013.01)

(58) Field of Classification Search
  CPC ............................ B60K 11/085; B62D 35/005
  USPC ............................................ 296/180.1, 180.3
  See application file for complete search history.

(56) References Cited

U.S. PATENT DOCUMENTS

| 4,457,558 | A | * | 7/1984 | Ishikawa | B60K 11/085 123/41.05 |
| 4,489,806 | A | * | 12/1984 | Shimomura | B62D 35/005 180/313 |
| 4,758,037 | A | * | 7/1988 | Suzuki | B62D 35/005 296/180.1 |
| 6,079,769 | A | * | 6/2000 | Fannin | B62D 35/005 296/180.1 |
| 6,286,893 | B1 | * | 9/2001 | Presley | B62D 35/005 296/180.5 |
| 8,302,714 | B2 | * | 11/2012 | Charnesky | B60K 11/085 180/68.1 |

* cited by examiner

Primary Examiner — Joseph D Pape
(74) *Attorney, Agent, or Firm* — Osha Liang LLP (57) ABSTRACT

An assembly for improving aerodynamics of a motor vehicle including a movable member forming an active aerodynamic dam positioned at a front end of the motor vehicle and attached to one end of at least one lever, wherein the at least one lever is connected to a motor that powers movement of the movable member, wherein the motor is operatively connected to at least one sensor configured to provide an input to the motor, the motor with a gear selector disposed within the motor that is configured to move a motor gear from a first gear position to a second gear position, resulting in the movable member being disposed in one of a retracted position, a transition position, and a lowered position, based on the received input.

27 Claims, 10 Drawing Sheets

ACTIVE AERODYNAMIC DAM AND METHODS OF USE THEREOF

BACKGROUND

Aerodynamics is the science of how air flows around and inside objects. More generally, it can be labeled "Fluid Dynamics" because air is really just a very thin type of fluid. Above slow speeds, the air flow around and through a motor vehicle begins to have a more pronounced effect on the acceleration, top speed, fuel efficiency and handling. Therefore, it is necessary to understand and optimize how the air flows around and through the motor vehicle, its openings and its aerodynamic devices, as aerodynamics play a big role on the overall build of motor vehicles. The aerodynamics of motor vehicles are designed for reducing drag, wind noise, minimizing noise emission, preventing undesired lift forces, bringing down CO2 emissions and other causes of aerodynamic instability at high speeds.

To understand the full aerodynamic effect of a motor vehicle, we need to take into account the frontal area of the vehicle. The frontal area defines the size of the hole the vehicle makes in the air as it drives through it. And thus a frontal pressure effect is created, or the effect created by a vehicle body pushing air out of the way. The Frontal pressure is caused by the air attempting to flow around the front of the vehicle. As millions of air molecules approach the front of the car, they begin to compress, and in doing so raise the air pressure in front of the car. At the same time, the air molecules travelling along the sides of the car are at atmospheric pressure, a lower pressure compared to the molecules at the front of the car. Just like an air tank, if the valve to the lower pressure atmosphere outside the tank is opened, the air molecules will naturally flow to the lower pressure area, eventually equalizing the pressure inside and outside the tank. The same rules apply to any vehicle. The compressed molecules of air naturally seek a way out of the high pressure zone in front of the vehicle, and they find it around the sides, top and bottom of the motor vehicle.

According to Bernoulli's principle, for a given volume of air, the higher the velocity the air molecules are travelling, the lower the pressure becomes. Likewise, for a given volume of air, the lower the velocity of the air molecules, the higher the pressure becomes. This applies to air in motion across a still body, or to a motor vehicle in motion, moving through relatively still air. In the frontal pressure section above, we said that the air pressure was high as the air rammed into the front grill of the car. What is happening is that the air slows down as it approaches the front of the car, and as a result more molecules are packed into a smaller space. Once the air stagnates at the point in front of the car, it seeks a lower pressure area, such as the sides, top and bottom of the car.

Additionally, a underside of the motor vehicle is also responsible for creating lift or downforce. If a motor vehicle's front end is lower than the rear end, then the front end restricts the air flow under the car and the widening gap between the underside and the road creates a low pressure area. If there is neutral or higher air pressure above the car, then we get downforce due to the difference in the pressure above and below the car. Therefore, an air dam at the front of the motor vehicle may restrict the flow of air reaching the underside of the car. The air dam does this by creating a "dam" or wall across the front of the motor vehicle that extends close down to the road and creates an area of vacuum or low pressure underneath the motor vehicle. This low pressure area, in combination with the higher pressures above the front and top of the vehicle, effectively generates downforce at the front of the vehicle. In many cases, the air dam also reduces the Coefficient of Drag ($C_d$) of the vehicle. $C_d$ is a dimensionless value well known to those skilled in the art to enable the comparison of the drag produced by one motor vehicle versus another. Every motor vehicle has a $C_d$ which can be measured using wind tunnel data. The $C_d$ can be used in drag equations to determine the drag force at various speeds.

Figure 1:
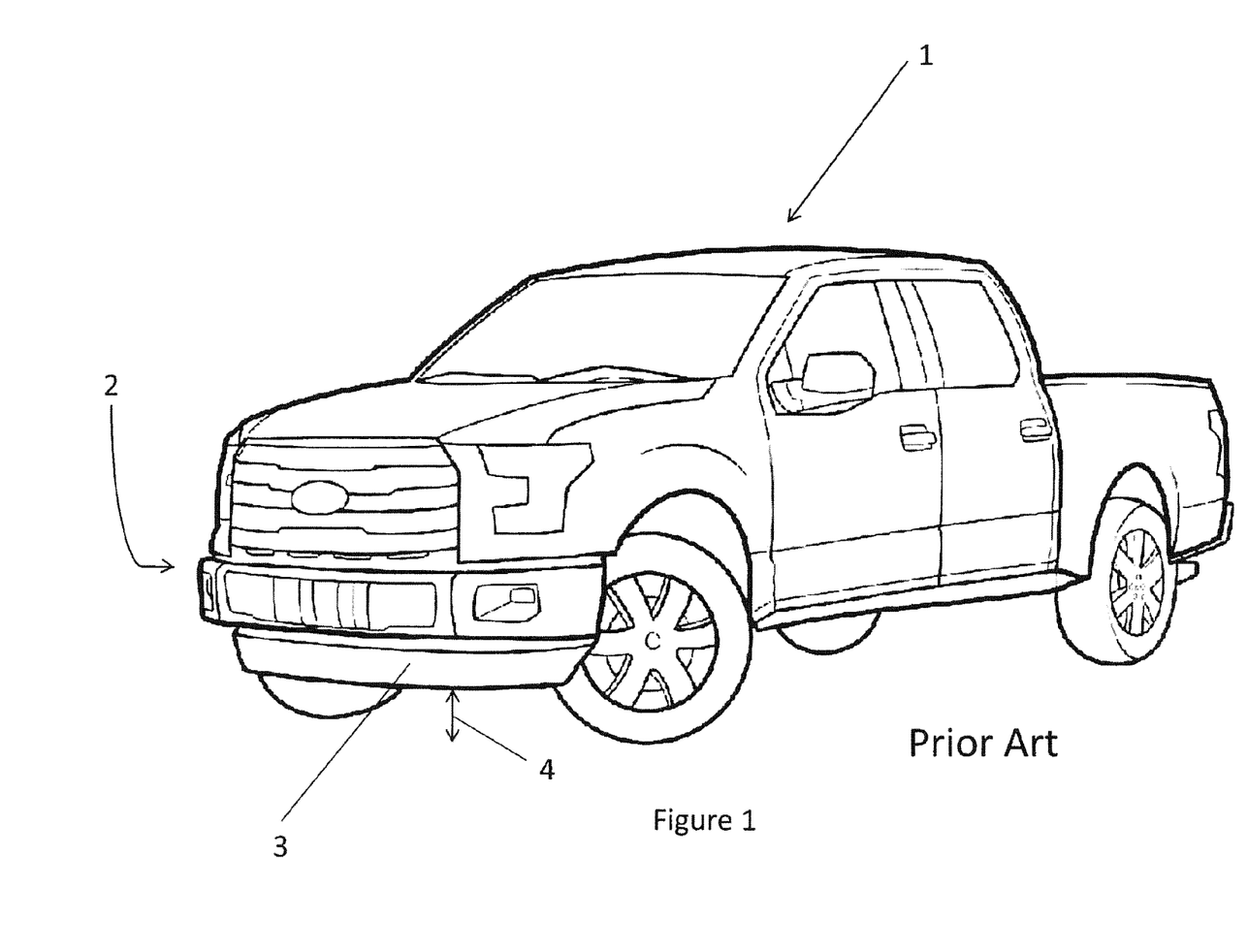
FIG. 1 illustrates a prospective view of an air dam according to one or more embodiments of the prior art.

With new regulations for new motor vehicles requiring a reduction of the CO2 emissions, front end aerodynamics play key role in bringing down CO2 emissions on motor vehicles. As seen by FIG. 1, the prior art shows a motor vehicle 1 with a front end 2 having an air dam 3. Furthermore, the air dam 3 is attached to be fixed at one spot below the front end 2 making the air dam 3 non-movable. Typically, the air dam 3 is made of up one piece plastic and reduces a ground clearance 4 of the motor vehicle 1. Often, this may result in scraping of the air dam 3 on the pavement during parking and severe damage during off-roading since angle of approach is reduced significantly. Further seen by FIG. 1, the motor vehicle 1 is a truck, however, the motor vehicle 1 may also be understood to be a car, sport utility vehicle or suburban utility vehicle (SUV), or any known automobile in the art.

SUMMARY OF DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, the embodiments disclosed herein relate to an assembly for improving aerodynamics of a motor vehicle including a movable member forming an active aerodynamic dam positioned at a front end of the motor vehicle and attached to one end of at least one lever, wherein the at least one lever is connected to a motor that powers movement of the movable member, wherein the motor is operatively connected to at least one sensor configured to provide an input to the motor, the motor with a gear selector disposed within the motor that is configured to move a motor gear from a first gear position to a second gear position, resulting in the movable member being disposed in one of a retracted position, a transition position, and a lowered position, based on the received input.

In general, in one aspect, the embodiments disclosed herein relate to a method for improving aerodynamics of a motor vehicle including receiving an input signal by a motor indicating a speed at which a motor vehicle is traveling, moving a motor gear from a first gear to second gear based on the input signal received by a gear selector disposed in the motor, wherein the second gear controls at least one lever, moving the at least one lever based on the input signal received by the motor, wherein a first end of the lever is connected to the motor and a second end of the lever is connected to a movable member, positioning the movable member to be at one of a retracted position, a transition position or a lowered position based on the speed of the motor vehicle, and guiding air around a front end of the motor vehicle with the movable member.

DETAILED DESCRIPTION

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description. Those skilled in the art would appreciate how the term motor vehicle hereinafter may be understood to be a truck, a car, sport utility vehicle or suburban utility vehicle (SUV), or any known automobile in the art. As used herein, the term "coupled" or "coupled to" or "connected" or "connected to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

Aerodynamics become important when the motor vehicle is at speeds more than 50 Km/hr. The present disclosure, in one or more embodiments, provides an active aerodynamic dam (i.e., movable member) attached to a front end of a motor vehicle. Specifically, in one or more embodiments, the active aerodynamic dam is positioned higher up from the road or closer to the motor vehicle (i.e. a retracted position) below the speed of 50 Km/hr. The active aerodynamic dam may come down closer to the road (i.e. a lowered position) when motor vehicle is at or above speeds of 50 Km/hr to provide aerodynamic benefits to the motor vehicle. Thus, when the motor vehicle at the speeds below 50 Km/hr, the active aerodynamic dam is retracted away from the road, thereby improving an angle of approach, a ground clearance and off-roading capabilities of the vehicle. As used herein, the terms "active aerodynamic dam" and "movable member" may be used interchangeably (i.e., the movable member forms the active aerodynamic dam).

Figure 2:
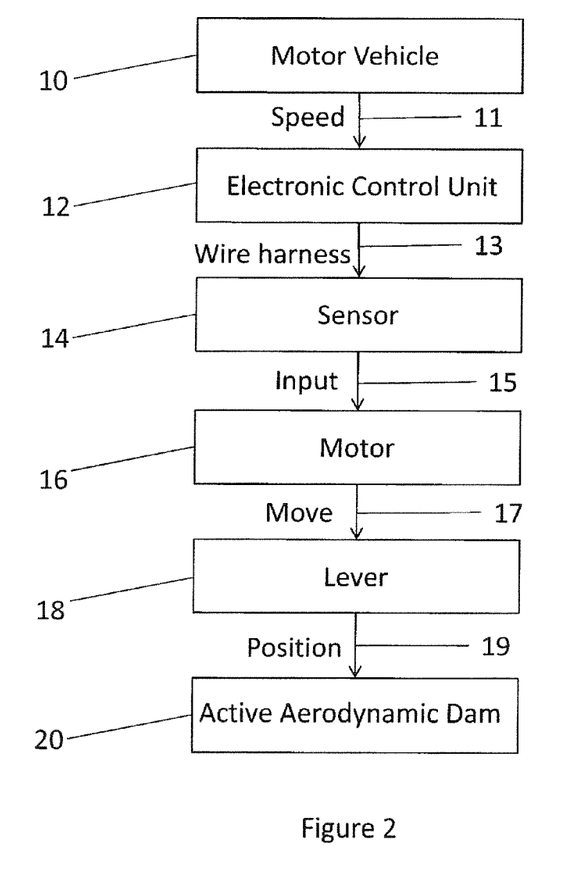
FIG. 2 illustrates a block diagram of using active aerodynamic dam according to one or more embodiments of the present disclosure.

Now referring to FIG. 2, a flow diagram for operation of the active aerodynamic dam according to one or more embodiments is shown. For purposes of discussion of FIG. 2, a motor vehicle 10 is traveling at a speed 11. As the motor vehicle 10 is traveling at the speed 11, an electronic control unit (ECU) 12 within the motor vehicle 10 detects the approximate speed 11 of the motor vehicle 10. The ECU 12 sends the approximate speed 11 through a wire harness 13 to a sensor 14 within the motor vehicle 10 (e.g., an electronic control module, an anemometer, a speed sensor, a pressure sensor, or any other suitable sensor). The sensor 14 registers the speed 11 as an input or an input signal 15 and sends this input 15 to a motor 16. The motor 16 is attached to a front of the motor vehicle 10. In one or more embodiments, the motor 16 is an active grill shutter (AGS) motor of the active grill shutter system attached to the front end of the motor vehicle. Furthermore, the AGS motor may be the only power source used to move the active aerodynamic dam, without the need of an additional power source.

One skilled in the art will appreciate that the motor 16 is not limited to being the AGS motor, and may be any type of motor, known the art, capable of powering the movement of the active aerodynamic dam 20. Continuing with FIG. 2, once the motor 16 receives the input 15, the motor 16 moves 17 a lever 18 based on the input 15. The lever 18 has a first end connected to the motor 16 and a second end connected to the active aerodynamic dam 20. Accordingly, movement of the lever 18 in turn causes movement of a movable member forming the active aerodynamic dam 20. As such, the lever 18 positions 19 the active aerodynamic dam 20 based on the input 15 of the speed 11 at which the motor vehicle 10 is traveling.

In one or more embodiments, the active aerodynamic dam 20 may have a plurality of positions with respect to the motor vehicle 10. For example, in one or more embodiments, the movable member of the active aerodynamic dam 20 has three positions: a retracted position at motor vehicle speeds of between 0 Km/hr to 20 Km/hr, a transition position at motor vehicle speeds of between 20 Km/hr to 50 Km/hr, and a lowered position at motor vehicle speeds of between 50 Km/hr to a maximum speed of the motor vehicle 10.

Those skilled in the art will appreciate that although embodiments disclosed herein provide for three positions of the movable member forming the active aerodynamic dam, the moveable member may have any number of positions without departing from the scope of the invention. For example, the movable member may have only two positions—a retracted position and a lowered position, based on a single speed threshold.

In one or more embodiments, the motor 16 receives the input 15 signal indicating at what speed 11 the motor vehicle 10 is traveling. The motor 16 then moves 17 the lever 18, based on the input signal, to position 19 the active aerodynamic dam in one of the retracted position, the transition position, or the lowered positioned. Thus, the active aerodynamic dam 20 may be positioned in one of the retracted position, the transition position, or the lowered positioned based on the speed 11 of the motor vehicle 10. Additionally, the active aerodynamic dam 20 is configured to guide air around and/or underneath the front end of the motor vehicle 10 in an efficient manner, based on the speed of the vehicle, to reduce $CO_2$ emissions of the vehicle. Sensor 14 may be any suitable sensor for detecting the speed of the vehicle or correlating/converting another measurement into the speed of the vehicle, such as wind speed, air pressure, etc. In one or more embodiments, sensor 14 may be an electronic control module (ECM), a wind pressure sensor, an anemometer, or a speedometer of the motor vehicle 10. Additionally, the input 15 signal may travel through at least one electronic component (not shown) of the motor vehicle 10 to be received by the motor 10. For example, in one or more embodiments, the input signal may travel through a connector operatively connected to the AGS motor (discussed below in FIG. 5). Further, the sensor 14 and the motor 16 may be equipped with wireless communication devices such as Bluetooth™, WiFi, or other wireless technologies, for transmitting/receiving the input signal.

Figure 3:
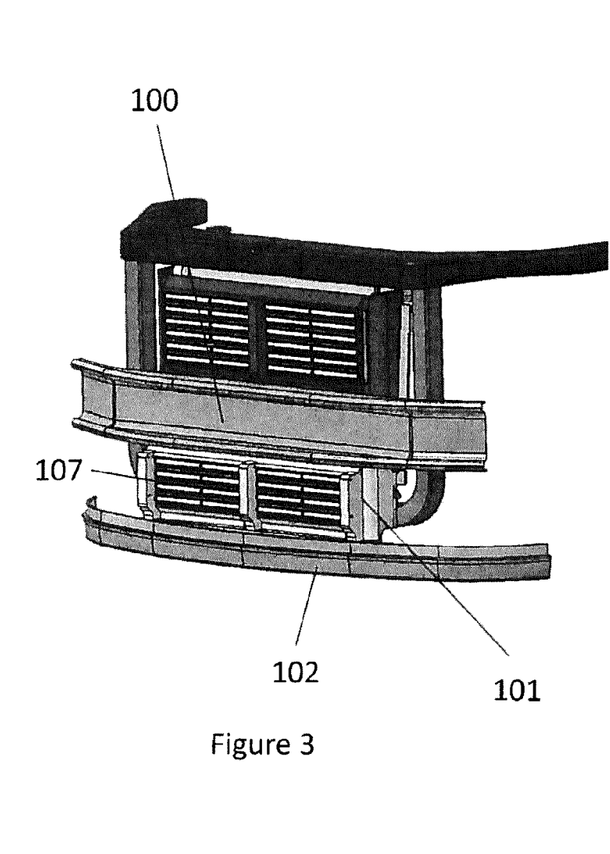
FIG. 3 illustrates a front view of an active aerodynamic dam according to one or more embodiments of the present disclosure.
Figure 4:
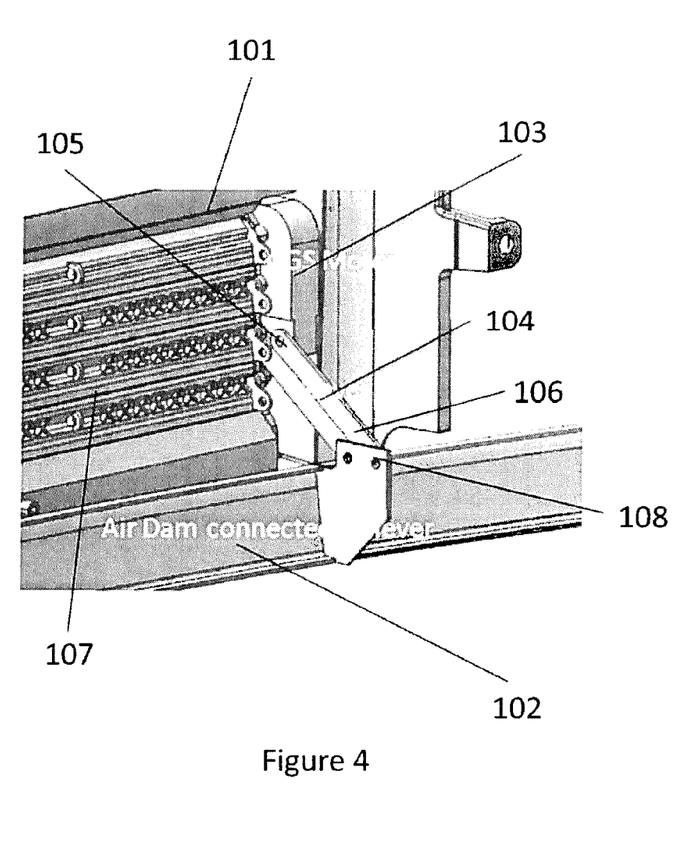
FIG. 4 illustrates a back view of an active aerodynamic dam according to one or more embodiments of the present disclosure.

As described above, an assembly for improving aerodynamics of a motor vehicle based on the speed 11 is described in more detailed below. As shown in FIG. 3, an active aerodynamic dam 102 is disposed below a front end 100 of a motor vehicle (not shown). Attachment devices used to attach the active aerodynamic dam 102 to the front end 100 of the motor vehicle are shown in FIG. 4. Additionally, referring to FIG. 3, the front end 100 of the motor vehicle may also include an active grill shutter (AGS) 101. Located in the front end 100 of the motor vehicle, the AGS 101 controls and adjusts air flow to improve the motor vehicle's aerodynamics and thermal performance using a system of controlled shutters. Furthermore, the AGS 101 is designed and optimized for air circulation and water tightness. The AGS 101 varies an air distribution by a motor (shown in FIG. 4) with integrated electronic controls to open and close shutters 107 of the AGS 101 with the thermal needs of the motor vehicle.

Referring now to FIG. 4, an embodiment illustrating an example of a back view of the active aerodynamic dam of the present disclosure is shown. For example, the active aerodynamic dam 102 is attached to the front end of the motor vehicle, or in some embodiments, the active aerodynamic dam 102 is attached to the AGS 101. As described above, the AGS 101 uses an active grill shutter (AGS) motor 103, to open and close the shutters 107. One skilled in the art will appreciate that the AGS motor 103 may be used for both operating the AGS 101 and moving the active aerodynamic dam 102. That is, in one or more embodiments, the active aerodynamic dam 102 may be powered by only the AGS motor 103, with no need for an additional power source. Alternatively, in one or more embodiments, the active aerodynamic dam 102 may be powered by a second motor (not shown) attached to the AGS 101 and configured operate the active aerodynamic dam 102 independent of the AGS motor 103. For example, in one or more embodiments, the front end of the motor vehicle (not shown) may not house the AGS 101, and as such, a second motor, suitable to operate the active aerodynamic dam 102, may be attached to a front bumper of the motor vehicle (not shown).

In one or more embodiments, in order to attach the active aerodynamic dam 102 to the AGS motor 103, a lever 104 is used to connect the two. The lever has a first end 105 attached to the AGS motor 103, and the active aerodynamic dam 102 is removably attached to a second end 106 of the lever 104. The lever 104 may be fixed length or an adjustable length (such as an adjustable strut). Both the first end 105 and second end 106 of the lever may use any mechanical fastener 108 known in the art to affix to the AGS motor 103 and the active aerodynamic dam on the respective ends (105, 106) of lever 104. Additionally, one skilled in the art will appreciate that the mechanical fastener 108 allows for easy attachment and detachment of the active aerodynamic dam 102, the lever 104, and/or the motor 103 for repairs and/or replacements.

As shown in FIGS. 5A-5E, in one or more embodiments, a cross-sectional view of an active grill shutter (AGS) motor 500 attached to a front end of a motor vehicle (not shown) is illustrated. In one or more embodiments, the AGS motor includes one or more components that facilitate the positioning of the movable member of the active aerodynamic dam. Components of the AGS motor are described in detail below.

The AGS motor 500 includes a box 501 (more generally, a housing) to encompass the internal components of the AGS motor 500. In one or more embodiments, a connector 502 is disposed on the box 501 and a communication part 503 of the connector 502 is within the box 501. The connector 502 receives an input signal from a sensor (not shown) and sends the signals through the communication part 503. The input signal travels from the communication part 503 into the circuit board 504 and is received by a gear selector 505. In one or more embodiments, the gear selector 505 includes an internal magnet (not shown) which is activated when the gear selector 505 receives the input signal based on a speed of the motor vehicle. One skilled in the art will appreciate that the gear selector 505 may have a voltage or current corresponding to the input signal received from the sensor. When activated, the magnet moves a handle 506 (see FIGS. 5C and 5D) which is attached to a motor gear 507. The handle 506 moves the motor gear 507 up and down on a rod 508. Additionally, the rod 508 has a stop 509. A spring 510 is disposed on the rod 508 positioned between the stop 509 and the motor gear 507.

Figures 5A, 5B, 5C, 5D:
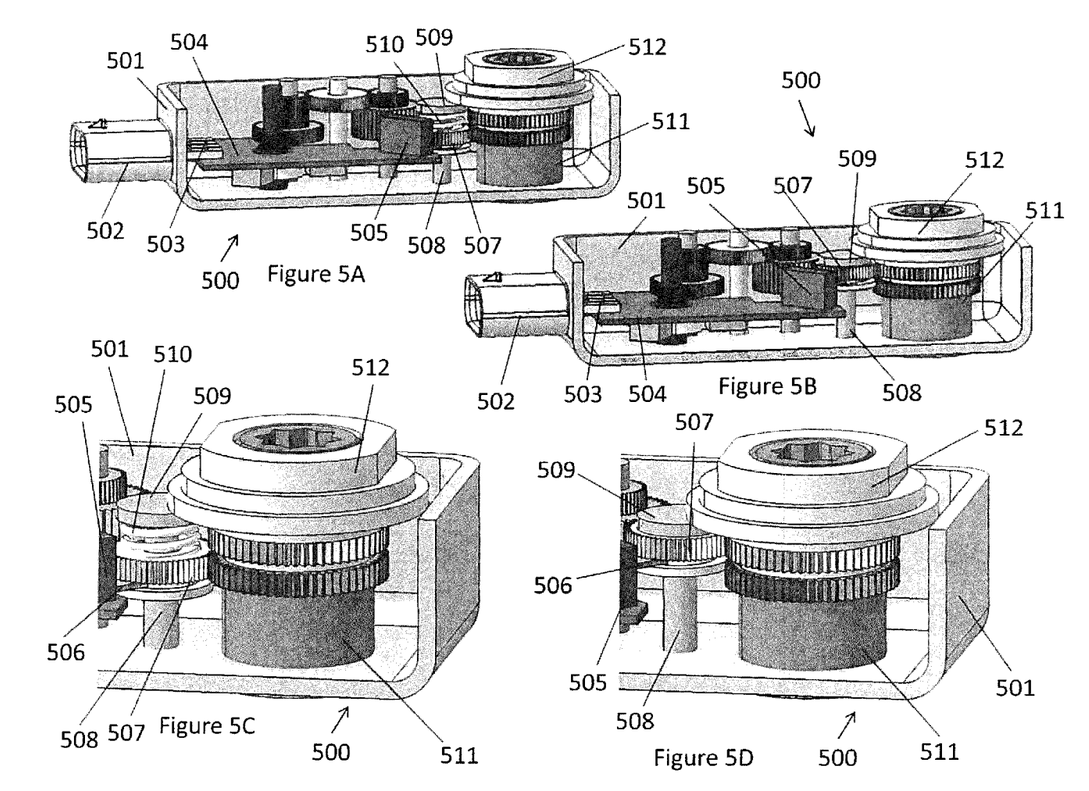
FIGS. 5A-5E illustrate a cross-sectional view of an active grill shutter motor according to one or more embodiments of the present disclosure
Figure 5E:
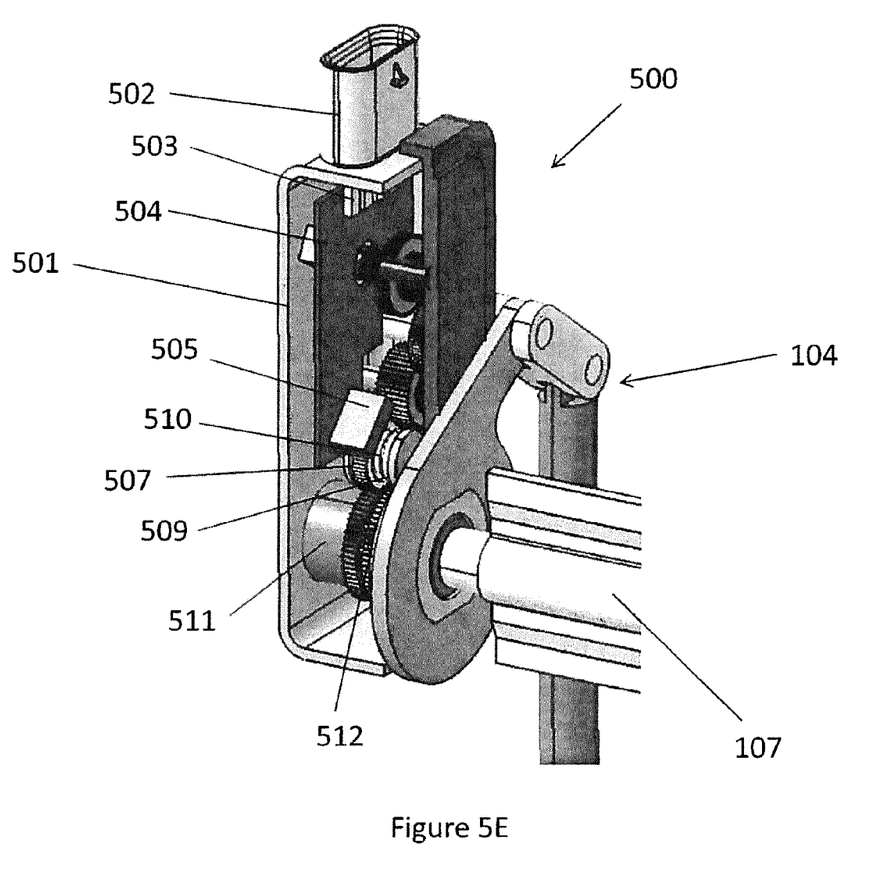

As shown in FIGS. 5A and 5C, the spring 510 is not compressed when the motor gear 507 is disposed to control an active grill shutter gear or a first gear 511. The first gear 511 opens and closes the shutters of active grill shutter (See FIG. 5E). Referring to FIGS. 5B and 5D, the spring 510 is compressed when the motor gear 507 is moved to control an active aerodynamic dam gear or a second gear 512. The second gear 512 moves the active aerodynamic dam (not shown) to one of the retracted position, the transition position, or the lowered position. Thus, in one or more embodiments, the AGS motor 500 is modified to include an additional gear 512 that is used to move the movable member of the active aerodynamic dam. As described above, the AGS motor 500 may be used to be the power source for both operating the AGS and moving the active aerodynamic dam. Further seen by FIG. 5E, the AGS motor 500 uses the first gear 511 to open and close the shutters 107. Additionally, the AGS motor 500 uses the second gear 512 to move the lever 104.

Figure 6A:
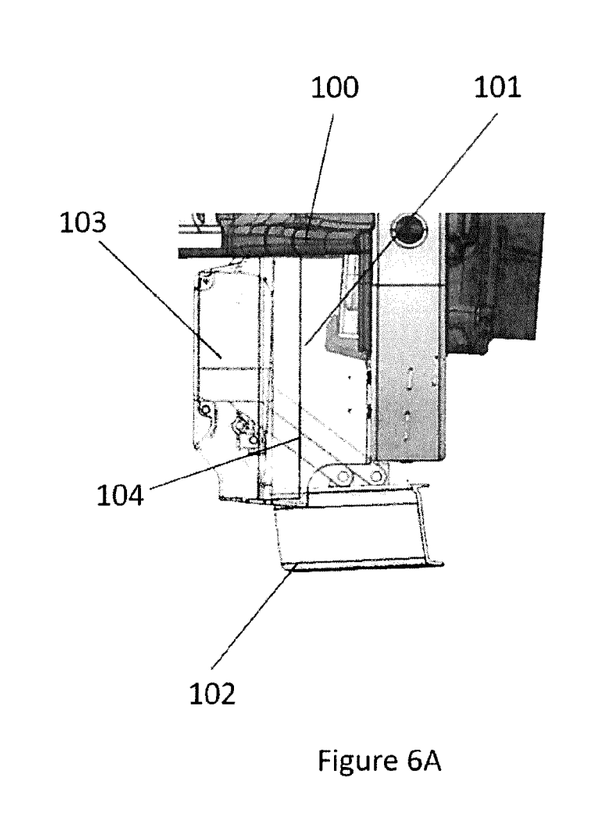
FIGS. 6A-6B illustrate an active aerodynamic dam in a retracted and lowered position according to one or more embodiments of the present disclosure.

As described above, the active aerodynamic dam 102 is positioned based on a speed of the motor vehicle. Referring now to FIG. 6A, in one or more embodiments, the active aerodynamic dam 102 is shown in a retracted position. In the retracted position, the motor vehicle (not shown) is traveling at speeds of 0 Km/hr to 20 Km/hr. While the motor vehicle is traveling at the speeds of 0 Km/hr to 20 Km/hr, a sensor (not shown) is providing an input to the AGS motor 103. One skilled in the art will appreciate that the sensor may be an electronic control module (ECM), an anemometer, a pressure sensor, a speedometer or any suitable device that may be used to derive and/or calculate the speed of the motor vehicle. As the AGS motor 103 receives the input from the sensor of the motor vehicle traveling at speeds of 0 Km/hr to 20 Km/hr, the AGS motor 103 moves the lever 104 to position the active aerodynamic dam 102 in the retracted position. As shown in FIG. 6A, in the retracted position, the active aerodynamic dam 102 is positioned where the movable member is closest to the AGS 101 and/or the front end 100 of the vehicle. Additionally, the retracted position enables the active aerodynamic dam 102 to receive the beneficial angle of approach, ground clearance and off-roading capabilities. When the speed of the motor vehicle surpasses 20 Km/hr but stays under 50 Km/hr, the AGS motor 103 positions the active aerodynamic dam 102 at a transition position (not shown). The positioning of the active aerodynamic dam 102 in the transition position is such that the active aerodynamic dam 102 is at any point in between the retracted position (shown in FIG. 6A, 7A, 8A, 9A, 10A) and the lowered position (shown in FIG. 6B, 7B, 8B, 9B, 10B). In other words, the transition position of the movable member is defined as any point between the retracted position and the lowered position.

In one or more embodiments, each of the retracted, transition, and lowered positions may also be defined as an angle. That is, a certain angle formed by the movable member and the lever or the movable member in relation to the front bumper, or another portion of the front end of the vehicle, may define each of the aforementioned positions.

Figure 6B:
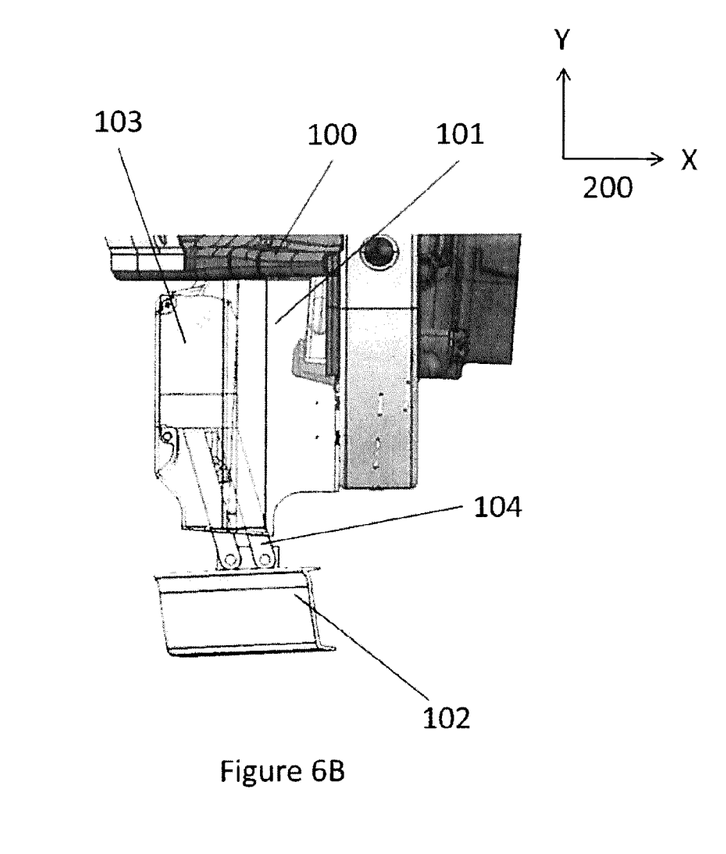

Now referring to FIG. 6B, in one or more embodiments, the active aerodynamic dam 102 is shown in a lowered position. When the movable member of the active aerodynamic dam 102 is in the lowered position, the motor vehicle (not shown) is traveling at speeds of between 50 Km/hr and a maximum speed of the motor vehicle. As the AGS motor 103 receives the input signal from the sensor configured to derive or measure the speed of the motor vehicle, the AGS motor 103 moves the lever 104 to position the movable member of the active aerodynamic dam 102 in the lowered position. As shown in FIG. 6B, in the lowered position, the active aerodynamic dam 102 is positioned where the movable member is furthest from the AGS 101 and/or the front end 100 of the vehicle. Furthermore, when the active aerodynamic dam 102 is moving to the retracted position, the transition position, or the lowered position, the active aerodynamic dam 102 moves in both an X-axis direction and a Y-axis direction, with respect to graph 200. One skilled in the art will appreciate that a slope of a line (not shown) in graph 200, mapping the movement of the active aerodynamic dam 102, may be increasing, decreasing, or curved with respect to FIGS. 6A and 6B. One skilled in the art will appreciate that the active aerodynamic dam 102 may move from the retracted position to the transition position to the lowered position, or any series combination of the positions without being limited the motor vehicle linearly accelerating or decelerating. Additionally, it is further envisioned that there may be a manual override on either the AGS motor 103 or elsewhere within the motor vehicle to lock the active aerodynamic dam 102 at one position regardless of the speed of travel of the vehicle.

Further examples of the connection between the lever and the movable member of the active aerodynamic dam, and between the lever and the AGS motor, are discussed below. Those skilled in the art will appreciate that the invention is not limited to the examples discussed below.

Figures 7A, 7B, 7C, 7D:
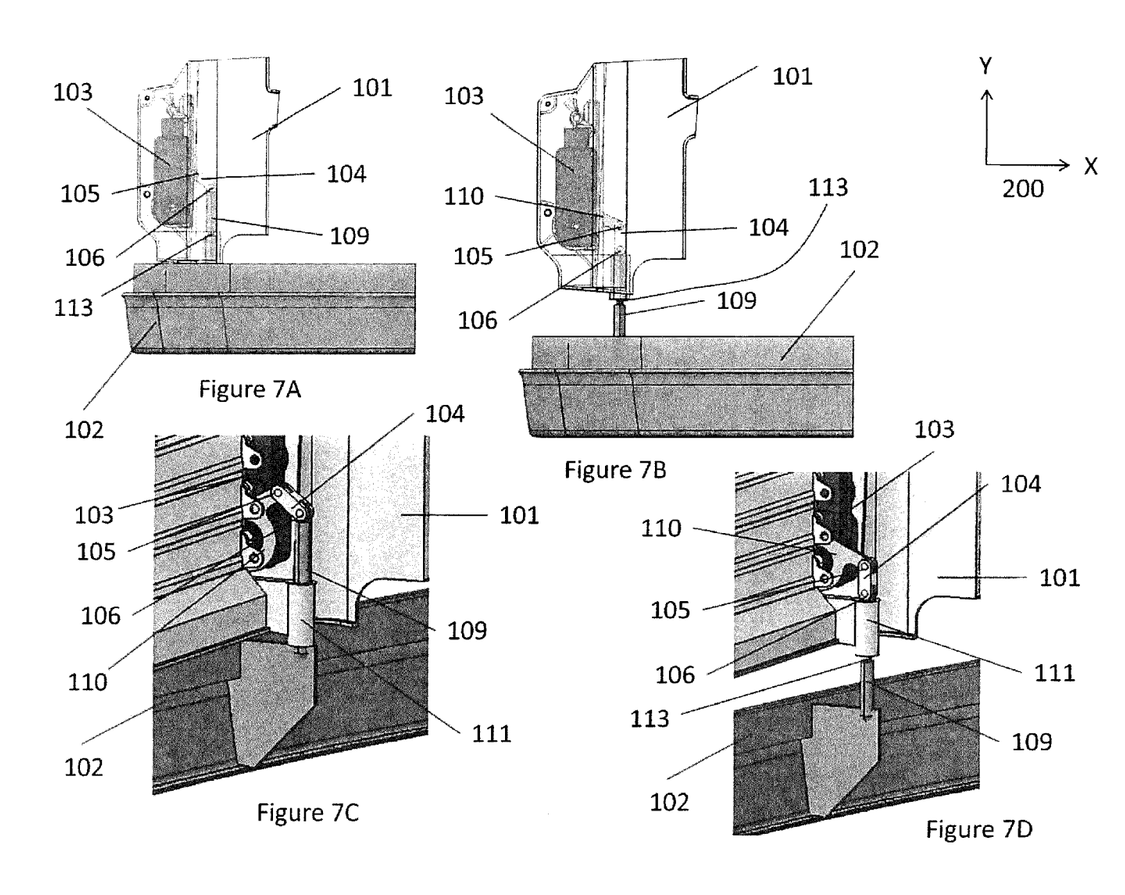
FIGS. 7A-7D illustrate an active aerodynamic dam in a retracted and lowered position according to one or more embodiments of the present disclosure.

With regard to FIGS. 7A-7D, in one or more embodiments, the lever 104 is shown to have the first end 105 and the second end 106 attached to a hinge 110 and a rod 109, respectively. The hinge 110 is attached to the AGS motor 103 and moves the lever 104 up and down. Additionally, the rod 109 may be attached to the movable member forming the active aerodynamic dam 102 by a mechanical fastener or may be integrated into the active aerodynamic dam. As shown in FIGS. 7A and 7C, the active aerodynamic dam 102 is in the retracted position. In the retracted position, the motor vehicle (not shown) is traveling at speeds of 0 Km/hr to 20 Km/hr. As the AGS motor 103 receives the input from the sensor of the motor vehicle traveling at speeds of 0 Km/hr to 20 Km/hr, the hinge 110 is moved by the AGS motor 103 to be in an up position, thereby moving the lever 104 and rod 109 up, to position the active aerodynamic dam 102 in the retracted position.

Now referring to FIGS. 7B and 7D, the movable member forming the active aerodynamic dam 102 is in the lowered position. In the lowered position, the motor vehicle (not shown) is traveling at speeds of 50 Km/hr to a maximum speed of the motor vehicle. As the AGS motor 103 receives the input from the sensor of the motor vehicle traveling at speeds of 50 Km/hr to a maximum speed, the hinge 110 is moved by the AGS motor 103 to be in a lowered position, thereby moving the lever 104 and rod 109 down, to position the active aerodynamic dam 102 in the lowered position. Furthermore, FIGS. 7C and 7D show a guide 111 that is attached to the AGS 101. In one or more embodiments, the guide 111 has an opening through which the rod 109 passes. Additionally, the guide 111 aids in the stabilizing the active aerodynamic dam 102 to move in a linear path. Furthermore, when the active aerodynamic dam 102 is moving to the retracted position, the transition position, or the lowered position, the active aerodynamic dam 102 moves in only in the Y-axis direction, with respect to graph 200. Further shown in FIGS. 7A, 7B, and 7D, the rod 109 has a bottle neck 113. In the case the motor vehicle (not shown) is damaged in a motor vehicle accident, the bottle neck 113 is designed to break and detach the active aerodynamic dam 102 from the front end of the motor vehicle. As such, the active aerodynamic dam 102 will not damage any other equipment on the motor vehicle in the case of a motor vehicle accident.

Figures 8A, 8B, 8C, 8D:
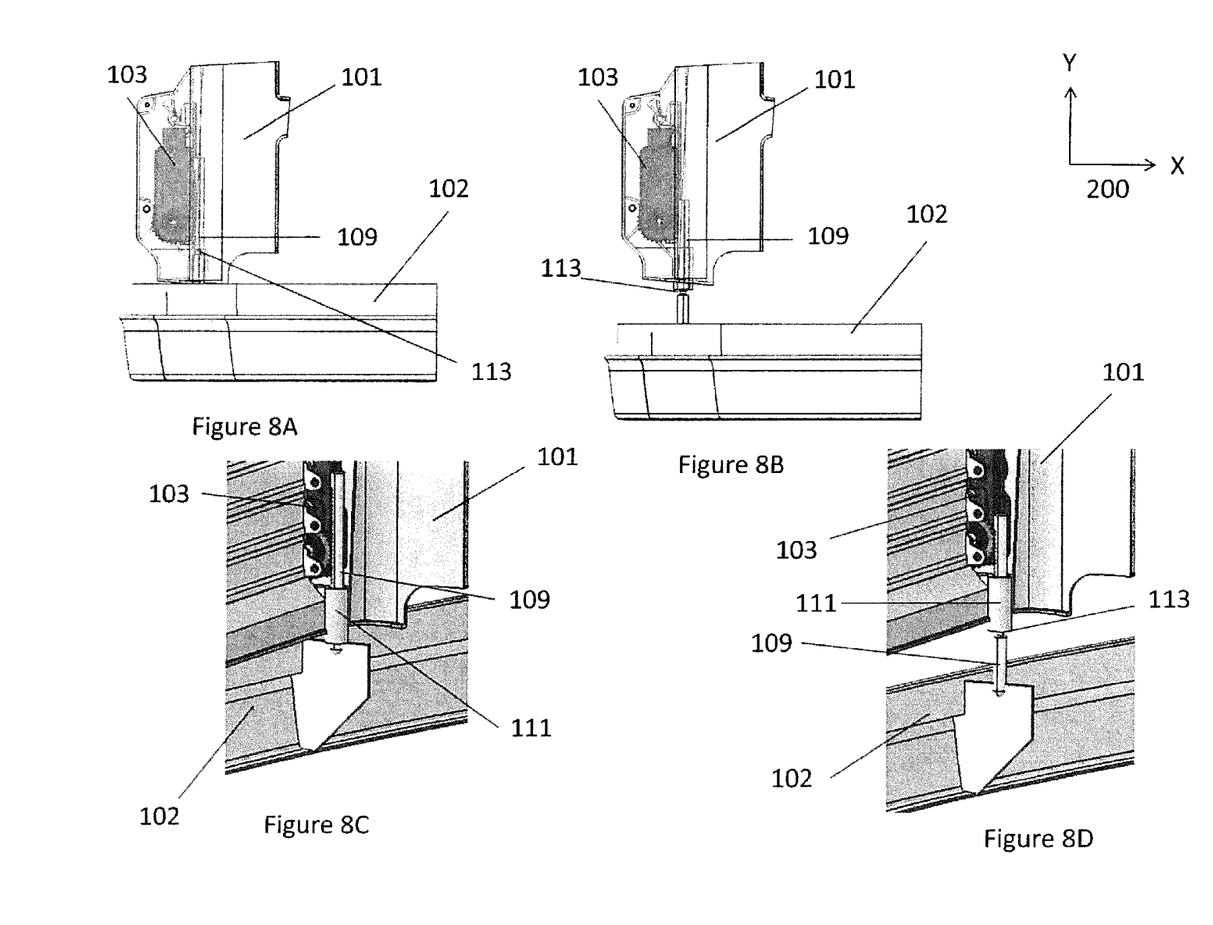
FIGS. 8A-8D illustrate an active aerodynamic dam in a retracted and lowered position according to one or more embodiments of the present disclosure.

Referring to FIGS. 8A-8D, in one or more embodiments, the rod 109 is shown to have a first end integrated into the movable member forming the active aerodynamic dam 102. Additionally, the rod 109 has a second end directly attached to the AGS motor 103, and thus, the rod 109 acts as the lever 104 (shown above in FIGS. 4-6D). As shown in FIGS. 8A and 8C, the active aerodynamic dam 102 is in the retracted position. In the retracted position, the motor vehicle (not shown) is traveling at speeds of 0 Km/hr to 20 Km/hr. As the AGS motor 103 receives the input from the sensor of the motor vehicle traveling at speeds of 0 Km/hr to 20 Km/hr, the rod 109 is moved by the AGS motor 103 to be in an upward position to position the active aerodynamic dam 102 in the retracted position.

Now referring to FIGS. 8B and 8D, the movable member forming the active aerodynamic dam 102 is in the lowered position. In the lowered position, the motor vehicle (not shown) is traveling at speeds of 50 Km/hr to a maximum speed of the motor vehicle. As described, the sensor (not shown) is providing an input to the AGS motor 103. As the AGS motor 103 receives the input from the sensor of the motor vehicle traveling at speeds of 50 Km/hr to a maximum speed, the rod 109 is moved by the AGS motor 103 to be in a down position to position the active aerodynamic dam 102 in the lowered position. Furthermore, FIGS. 8C and 8D illustrate the guide 111 is attached to the AGS 101. The guide 111 has an opening in which the rod 109 is allowed to pass through. Additionally, the guide 111 aids in the stabilizing the active aerodynamic dam 102 to move in a linear path. Furthermore, when the active aerodynamic dam 102 is moving to the retracted position, the transition position, or the lowered position, the active aerodynamic dam 102 moves in only in the Y-axis, with respect to graph 200. Further shown in FIGS. 8A, 8B, and 8D, the rod 109 has a bottle neck 113. In the case the motor vehicle (not shown) is damaged in a motor vehicle accident, the bottle neck 113 is designed to break and detach the active aerodynamic dam 102 from the front end of the motor vehicle. As such, the active aerodynamic dam 102 will not damage any other equipment on the motor vehicle in the case of a motor vehicle accident.

Figure 9A:
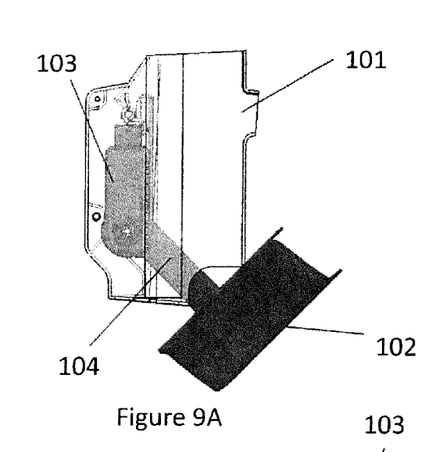
FIGS. 9A-9D illustrate an active aerodynamic dam in a retracted and lowered position according to one or more embodiments of the present disclosure.
Figure 9B:
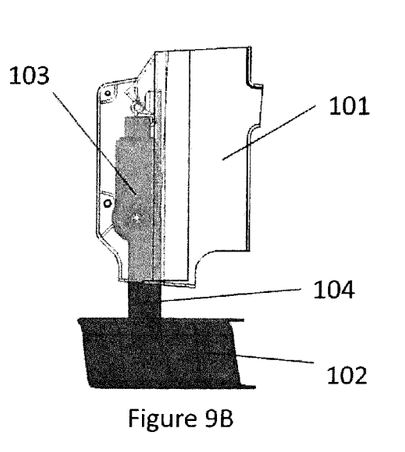
Figure 9C:
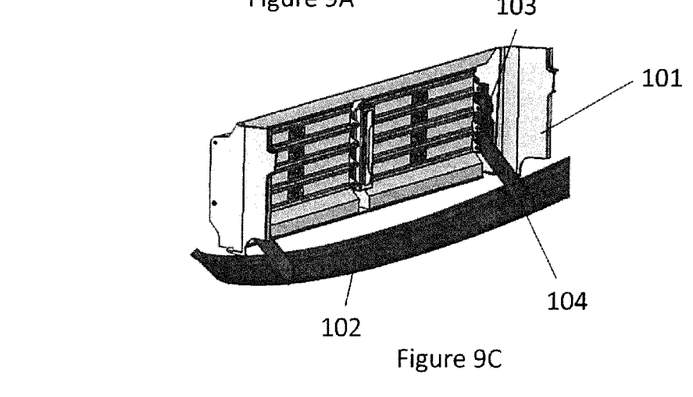

Referring to FIGS. 9A-9D, in one or more embodiments, the lever 104 is shown to have a first end integrated into the movable member forming the active aerodynamic dam 102. Additional, a second end of the lever 104 is directly attached to the AGS motor 103 by mechanical fasteners. As seen by FIGS. 9A and 9C, the active aerodynamic dam 102 is in the retracted position. In the retracted position, the motor vehicle (not shown) is traveling at speeds of 0 Km/hr to 20 Km/hr. While the motor vehicle is traveling at the speeds of 0 Km/hr to 20 Km/hr, a sensor (not shown) is providing an input to the AGS motor 103. One skilled in the art will appreciate how the sensor may be but not limited to an electronic control module, a wind pressure sensor, a speedometer or any device to calculate the speed of the motor vehicle. As the AGS motor 103 receives the input from the sensor of the motor vehicle traveling at speeds of 0 Km/hr to 20 Km/hr, the lever 104 is moved by the AGS motor 103 to be in an up and back position to position the active aerodynamic dam 102 in the retracted position.

Figure 9D:
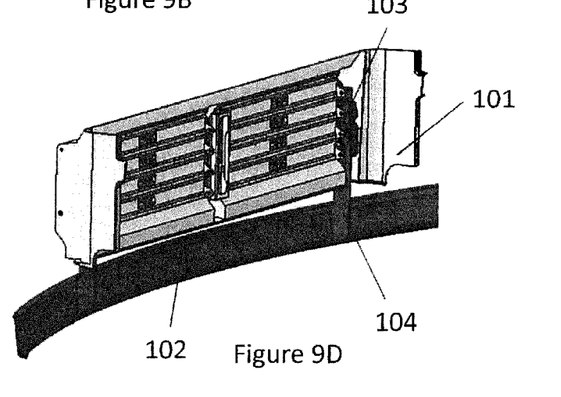

Now referring to FIGS. 9B and 9D, the movable member forming the active aerodynamic dam 102 is in the lowered position. In the lowered position, the motor vehicle (not shown) is traveling at speeds of 50 Km/hr to a maximum speed of the motor vehicle. As the AGS motor 103 receives the input from the sensor of the motor vehicle traveling at speeds of 50 Km/hr to a maximum speed, the lever 109 is moved by the AGS motor 103 to be in a down position (i.e. positioned perpendicular to the AGS 101) to position the active aerodynamic dam 102 in the retracted position. Furthermore, when the active aerodynamic dam 102 is moving to the retracted position, the transition position, or the lowered position, the active aerodynamic dam 102 moves in both an X-axis and Y-axis, with respect to graph 200. One skilled in the art will appreciate how a slope of a line (not shown) in the graph 200, mapping the movement of the active aerodynamic dam 102, may be increasing, decreasing, or curved with respect to FIGS. 9A-9D.

Figures 10A, 10B, 10C, 10D:
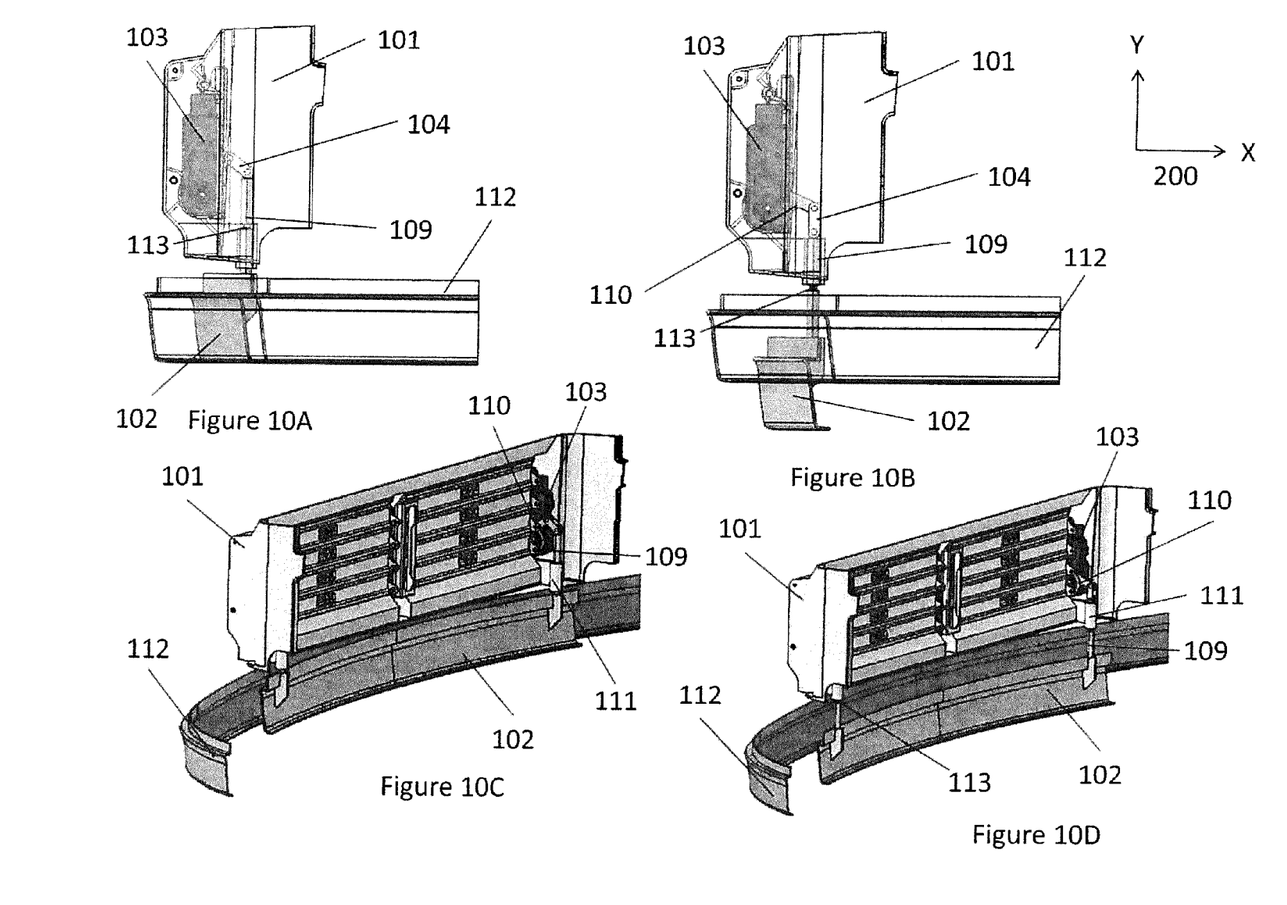
FIGS. 10A-10D illustrate an active aerodynamic dam in a retracted and lowered position according to one or more embodiments of the present disclosure.

With regards to FIGS. 10A-10D, in one or more embodiments, FIGS. 10A-10D show an air dam 112 fixed to the bottom of the AGS 101. The air dam 112 is a non-movable member which is positioned in front of the movable member forming the active aerodynamic dam 102 in the retracted position. Additionally, the lever 104 is shown to have the first end 105 and the second end 106 attached to a hinge 110 and a rod 109, respectively. The hinge 110 is attached to the AGS motor 103 and moves the lever 104 up and down. Additionally, the rod 109 is attached to the active aerodynamic dam 102 by a mechanical fastener or is integrated into the active aerodynamic dam. As seen by FIGS. 10A and 10C, the active aerodynamic dam 102 is in the retracted position. In the retracted position, the motor vehicle (not shown) is traveling at speeds of 0 Km/hr to 20 Km/hr. While the motor vehicle is traveling at the speeds of 0 Km/hr to 20 Km/hr, a sensor (not shown) is providing an input to the AGS motor 103. One skilled in the art will appreciate how the sensor may be but not limited to an electronic control module, a wind pressure sensor, a speedometer or any device to calculate the speed of the motor vehicle. As the AGS motor 103 receives the input from the sensor of the motor vehicle traveling at speeds of 0 Km/hr to 20 Km/hr, the hinge 110 is moved by the AGS motor 103 to be in an up position, thereby moving the lever 104 and rod 109 up, to position the active aerodynamic dam 102 in the retracted position.

Now referring to FIGS. 10B and 10D, the movable member forming the active aerodynamic dam 102 is in the lowered position. As the AGS motor 103 receives the input from the sensor of the motor vehicle traveling at speeds of 50 Km/hr to a maximum speed, the hinge 110 is moved by the AGS motor 103 to be in a down position, thereby moving the lever 104 and rod 109 down, to position the active aerodynamic dam 102 in the lowered position. Additionally, in the lowered position, the active aerodynamic dam 102 is lower than the air dam 112 (i.e., non-movable member). Furthermore, FIGS. 10C and 10D illustrate a guide 111 is attached to the AGS 101. The guide 111 has an opening through which the rod 109 passes. Additionally, the guide 111 aids in the stabilizing the active aerodynamic dam 102 to move in a linear path. Furthermore, one skilled in the art will appreciate how the air dam 112 (i.e., non-movable member) described in FIGS. 10A-10D may be used in any embodiment of the previously examples discussed above. Furthermore, when the active aerodynamic dam 102 is moving to the retracted position, the transition position, or the lowered position, the active aerodynamic dam 102 moves in only in the Y-axis, with respect to graph 200. Further shown in FIGS. 10A, 10B, and 10D, the rod 109 has a bottle neck 113. In the case the motor vehicle (not shown) is damaged in a motor vehicle accident, the bottle neck 113 is designed to break and detach the active aerodynamic dam 102 from the front end of the motor vehicle. As such, the active aerodynamic dam 102 will not damage any other equipment on the motor vehicle in the case of a motor vehicle accident.

As discussed, the active aerodynamic dam 102 may provide aerodynamic benefits to the motor vehicle, as well as provide the motor vehicle a beneficial angle of approach, ground clearance and off-roading capabilities. For example, when the active aerodynamic dam 102 is in the retracted position (see FIGS. 6A, 7A, 8A, 9A, and 10A), the motor vehicle is at a beneficial angle of approach, has proper ground clearance, and off-roading capabilities. Furthermore, the active aerodynamic dam 102, is able to guide the air around and/or underneath the motor vehicle, and thus improve the aerodynamics of the motor vehicle. When the active aerodynamic dam 102 guides the air flows underneath, this creates a lower pressure area under the vehicle, effectively providing down force and may reduce the Coefficient of Drag ($C_d$) of the motor vehicle. By improving the aerodynamics of the motor vehicle, the active aerodynamic dam 102 in turn reduces the $CO_2$ emissions of the motor vehicle. With the active aerodynamic dam 102, motor vehicles may have lower $CO_2$ emissions, better fuel efficiency, and smoother ride, all the while meeting or surpassing industry standards, new legislations, and customers' expectations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An assembly for improving aerodynamics of a motor vehicle, comprising:
a movable member forming an active aerodynamic dam positioned at a front end of the motor vehicle and attached to one end of at least one lever,
wherein the at least one lever is connected to a motor that powers movement of the movable member,
wherein the motor is operatively connected to at least one sensor configured to provide an input to the motor,
the motor comprising a gear selector disposed within the motor that is configured to move a motor gear from a first gear position to a second gear position, resulting in the movable member being disposed in one of a retracted position, a transition position, and a lowered position, based on the received input.

2. The assembly of claim 1, wherein the motor is an active grill shutter (AGS) motor attached to an active grill shutter of the front end of the vehicle and the movable member is only powered by the active grill shutter motor.

3. The assembly of claim 2, wherein the first gear is configured to control shutters of the active grill shutter when the motor gear is at the first gear.

4. The assembly of claim 2, wherein the input is a speed of the motor vehicle.

5. The assembly of claim of claim 4, further comprising a connector coupled to the motor and is configured to receive the input and send the input to the gear selector.

6. The assembly of claim of claim 4, wherein the gear selector comprises a magnet to move a handle and the handle is configured to move the motor gear on a rod from the first gear to the second gear or the second gear to the first gear.

7. The assembly of claim of claim 6, further comprising a spring disposed to the rod above the motor gear.

8. The assembly of claim 4, wherein:
the movable member is in the retracted position at the speed of 0 Km/hr to 20 Km/hr of the vehicle and the movable member is closet to the front end of the motor vehicle,
the movable member is in the transition position at the speed of 20 Km/hr to 50 Km/hr of the motor vehicle and the movable member is in-between the retracted position and the lowered position, and
the movable member is in the lowered position at the speed of 50 Km/hr to a maximum speed of the motor vehicle and the movable member is furthest from the front end of the vehicle.

9. The assembly of claim 1, wherein in the movable member extends a length of the front end of the motor vehicle.

10. The assembly of claim 1, wherein the at least one lever is an adjustable length.

11. The assembly of claim 1, wherein the movable member comprises a plastic, carbon fiber, and/or a metal material.

12. The assembly of claim 1, wherein the movable member is removably attached to the one end of the at least one lever by a mechanical fastener.

13. The assembly of claim 1, wherein the one end of the at least one lever is integrated with the movable member.

14. The assembly of claim 1, wherein the least one sensor is electronic control module (ECM), a wind pressure sensor, an anemometer, or a speedometer of the motor vehicle.

15. The assembly of claim 1, further comprising a non-movable member fixed to the front end of the motor vehicle in front of the movable member at the retracted position of the movable member.

16. A method for improving aerodynamics of a motor vehicle, comprising:
receiving an input signal by a motor indicating a speed at which a motor vehicle is traveling;
moving a motor gear from a first gear to second gear based on the input signal received by a gear selector disposed in the motor, wherein the second gear controls at least one lever;
moving the at least one lever based on the input signal received by the motor, wherein a first end of the lever is connected to the motor and a second end of the lever is connected to a movable member;
positioning the movable member to be at one of a retracted position, a transition position or a lowered position based on the speed of the motor vehicle; and
guiding air around a front end of the motor vehicle with the movable member.

17. The method of claim 16, further comprising:
positioning the movable member to the retracted position at the speed of 0 Km/hr to 20 Km/hr of the motor vehicle and the movable member is closest to the front end of the motor vehicle at the retracted position;
positioning the movable member to the transition position at the speed of 20 Km/hr to 50 Km/hr of the motor vehicle and the movable member is between the retracted and lowered position; and
positioning the movable member to the lowered position at the speed of 50 Km/hr to a maximum speed of the motor vehicle and the movable member is furthest to the front end of the motor vehicle at the lowered position.

18. The method of claim 16, wherein sending the input signal from electronic control module (ECM), a wind pressure sensor, an anemometer, or a speedometer of the motor vehicle.

19. The method of claim 18, wherein the input signals travel from the electronic control module, the wind pressure sensor, or the speedometer to a connector of the motor.

20. The method of claim 19, further comprising sending the input signals from the connector to the gear selector.

21. The method of claim 20, further comprising activating a magnet within the gear selector to move a handle and the handle moves the motor gear from the first gear to the second gear or the second gear to the first gear.

22. The method of claim 21, further comprising compressing a spring when the motor gear at the second gear and decompressing the spring when the motor gear is at the first gear.

23. The method of claim 16, further comprising removably attaching the movable member to the second end of the at least one lever with a mechanical fastener.

24. The method of claim 16, further comprising removably attaching a non-movable member to the front end of the motor vehicle with a mechanical fastener to be fixed in front of the movable member in the retracted position.

25. The method of claim 16, further comprising moving the movable member in a Y-axis or both the Y-axis and a X-axis.

26. The method of claim 16, further comprising opening or closing shutters of an active grill shutter with the motor gear at the first gear.

27. An active aerodynamic dam, comprising:
a movable member being positioned at a front end of the motor vehicle and attached to one end of at least one lever,
wherein the at least one lever is connected to an active grill shutter (AGS) motor attached to an active grill shutter of the front end of the vehicle, wherein the movable member is powered only by the AGS motor, wherein the motor is operatively connected to at least one sensor configured to provide an input to the motor, and wherein the motor comprises a gear selector disposed within the motor that is configured to move a motor gear from a first gear position to a second gear position, resulting in the movable member being disposed in one of a retracted position, a transition position, and a lowered position, based on the received input.

* * * * *